United States Patent [19]

Patton

[11] 4,324,836
[45] Apr. 13, 1982

[54] POLYMERS CHARACTERIZED BY 1,3-IMIDAZOLIDINE-1,3-DIYL RINGS PLASTICIZED WITH AROMATIC NITRILES

[75] Inventor: Tad L. Patton, Baytown, Tex.

[73] Assignee: Exxon Research & Engineering Co., Florham Park, N.J.

[21] Appl. No.: 158,193

[22] Filed: Jun. 11, 1980

[51] Int. Cl.³ .................... C08K 5/18; B32B 27/04; B32B 27/22; B32B 27/28
[52] U.S. Cl. .................. 428/336; 524/205; 524/209; 524/589
[58] Field of Search ............ 260/32.4, 30.8 R, 32.6 N, 260/32.6 NT, 30.6 R; 428/336

[56] References Cited

U.S. PATENT DOCUMENTS

| | | | |
|---|---|---|---|
| 2,319,634 | 5/1943 | Sauser | 260/32.4 |
| 2,476,264 | 7/1949 | Niederhauser | 260/32.4 |
| 3,039,984 | 6/1962 | Beindorff et al. | 260/32.4 |
| 3,171,816 | 3/1965 | Peter et al. | 252/510 |
| 3,393,081 | 7/1968 | Bogle | 106/267 |
| 3,609,113 | 9/1971 | Schade et al. | 260/30.2 |
| 3,661,859 | 5/1972 | Patton | 528/48 |
| 3,739,007 | 6/1973 | Schwager et al. | 260/464 |
| 3,791,916 | 2/1974 | Eastes | 428/523 |
| 4,136,077 | 1/1979 | Williams et al. | 260/32.4 |
| 4,147,684 | 4/1979 | Patton | 260/30.8 R |

FOREIGN PATENT DOCUMENTS 1102030  3/1961  Fed. Rep. of Germany .
53-52560  5/1978  Japan .

OTHER PUBLICATIONS

Derwent Abs. 78695 V/45, Class 260/Sub 32.4, "Butadiene–Nitrile Rubber Compsns–cont a Dibasic Acid Dinitrile as Plasticizer", S.U.411096, 6-4-74.

Primary Examiner—Joseph L. Schofer
Assistant Examiner—Herbert J. Lilling
Attorney, Agent, or Firm—M. B. Kurtzman

[57] ABSTRACT

Normally intractable polymers of the structure:

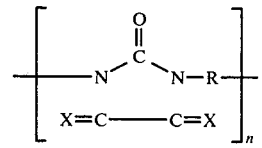

wherein X is O or NH, provided at least one X is O, such as poly(parabanic acids) are made extrudable by composition with from 10 to 60 weight percent of an aromatic nitrile.

25 Claims, No Drawings

POLYMERS CHARACTERIZED BY 1,3-IMIDAZOLIDINE-1,3-DIYL RINGS PLASTICIZED WITH AROMATIC NITRILES

BACKGROUND OF THE INVENTION

1. Field of the Invention

The present invention relates to the discovery of a specific class of plasticizers for poly(iminoimidazolidinediones) and poly(parabanic acid) resins.

2. Prior Art

Both the poly(iminoimidazolidinediones) and poly(parabanic acids) and their methods of preparation are known and described in detail in my commonly assigned U.S. Pat. No. 3,661,859, which is incorporated in its entirety herein. The poly (parabanic acids) may also be prepared by other processes, such as shown in U.S. Pat. No. 3,609,113.

The poly(iminoimidazolidinediones) may be formed by the reaction of hydrogen cyanide with a diisocyanate or mixture of diisocynates, the reaction of a dicyanoformamide with a diisocyanate or mixtures of diisocyanates, or the polymerization of a cyanoformamidyl isocyanate and contain a 1,3-imidazolidinedione-1,3-diyl ring of the following structures in the repeat units:

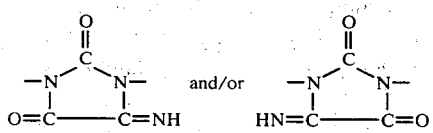

wherein NH is in the 4 or 5 position.

The poly(parabanic acids) also designated as poly(1,3-imidazolidine-2,4,5-triones) may be prepared, for example, by the acid hydrolysis of poly(iminoimidazolidinediones) and contain the imidazolidinetrione ring in the repeat unit:

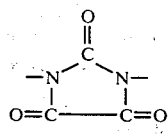

U.S. Pat. No. 3,609,113 and German Pat. No. 1,770,146 describe other methods for preparing polymers which contain the poly(parabanic acid) ring.

The polymers may contain both imino-1,3-imidazolidinedione-1,3-diyl rings and imidazolidinetrione rings, thus the present polymers may be broadly characterized as having the repeating unit:

wherein Q is

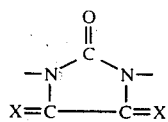

wherein X is O or NH, provided that at least one X is O, R is an organic moiety which may be aliphatic, alicyclic, aromatic or mixtures thereof, and n is sufficiently large to produce a solid product.

The R is the organic moiety of the diisocyanate when the polymer is produced according to the procedure in U.S. Pat. No. 3,661,859. Thus, the diisocyanates may be selected from a broad group having a large variety of organic moieties. The organic moieties of the diisocyanate may be substituted with groups such as alkyl, aryl, halogens, sulfoxy, sulfonyl, alkoxy, aryloxy, oxo, ester, alkylthio, arylthio, nitro and the like which do not react with the isocyanate group. Functional groups which have active hydrogen atoms, (e.g., carboxylic acids, phenols, amines, etc.) should not be present. Specific diisocyanates which may be used are set out in U.S. Pat. No. 3,661,859, other patents, articles or organic textbooks as known in the art.

Some of the parabanic acid polymers have been found to have high glass transition temperatures, and thus are especially suitable as magnetic tapes (where good dimensional stability at high temperatures is required), films for use in flexible printed circuits, cable wraps, etc., for fibers such as tire cord fibers (where tensile strength and modulus are required), for moldings for electrical connectors, bearings, magnetic wire insulation, coatings for cables, cookware, glass fabrics, industrial belts (where high temperatures are required) and the like.

However, many of the present polymers decompose when they are heated at or above their glass transition temperatures and as a result they can not be molded or extruded. Previously these polymers could be processed only by solution methods or by a powder coating technique which also requires a solvent.

It is an advantage of the compositions of the present invention that the poly(iminoimidazolidinediones), poly(imidazolidine-2,4,5-triones) or mixed poly(iminoimidazolidine-1,3-dione/imidazolidine-2,4,5-triones) or as defined above the polymers

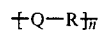

may be processed by extrusion and molding techniques, when plasticized according to the present invention. Also films of the compositions of the present invention can be heat-sealed whereas films of the same pure polymers can not be sealed with heat.

SUMMARY OF THE INVENTION

Briefly, the present invention is a stable meltable composition comprising heterocyclic polymers characterized in the repeating unit by the tri-substituted 1,3-imidazolidine-1, 3-diyl ring:

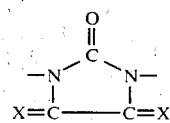

wherein X=O or NH, provided at least one X is O or more specially polymers having the repeating unit:

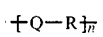

wherein Q is

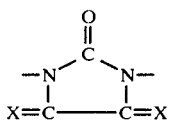

and X has the significance set out above, R is an organic moiety which may be aliphatic, alicyclic, aromatic or mixtures thereof and n is sufficiently large to produce a solid product and a plasticizing amount of an aromatic nitrile.

More particularly, the polymers may be poly(iminoimidazolidinediones) characterized by a tri-substituted 1,3-imidazolidine-1,3-diyl ring of the following structure:

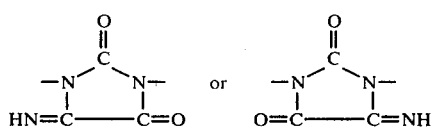

poly(parabanic acids) characterized by a tri-substituted 1,3-imidazolidine-1,3-diyl ring of the following structure:

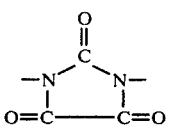

or more specifically, polymers of the general structure:

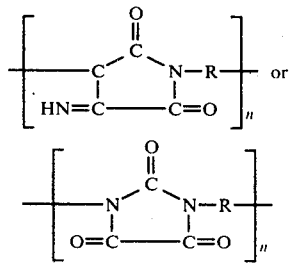

respectively, wherein R and n have the significance given above.

The plasticized compositions of the present invention are capable of being melted without decomcomposition. The polymers may be films, powders or the like.

The term "plasticizing amount" as used herein means that amount of aromatic nitrile, (1) which is incorporated in and compatible with the polymer to form a homogeneous composition or (2) which is applied on a surface of the polymer and which will allow the polymer to melt without decomposition. Generally, the plasticizer incorporated into the polymer will comprise from 10 to 50 weight percent of the total weight of polymer and plasticizer, although the plasticizers may be used in slightly smaller amounts, i.e., about 5% and in somewhat larger amounts, e.g., up to about 60%. These compositions may be further characterized as "extrudable". Films of these compositions can be sealed by heating.

DETAILED DESCRIPTION OF THE INVENTION

It was found that conventional plasticizers such as mixtures of N-ethyl-o-toluene sulfonamide and N-ethyl-p toluene sulfonamide and mixtures of o-toluene sulfonamide and p-toluene sulfonamide were not useful for plasticizing the present polymers. Generally, the compositions containing these plasticizers melted but were subject to decomposition at the temperatures required to melt the blends if normal mixing procedures were used, i.e., adequate blending time of the polymer and plasticizer. Those blends which were melted in small batches for only a few minutes exhibited poor thermal stability when heating and mixing were continued.

These problems are substantially overcome by the use of aromatic nitriles as plasticizers according to the present invention. Various references in the prior art to the use of aliphatic nitriles as plasticizers, e.g., U.S. Pat. Nos. 2,319,634, 3,739,007 and 4,136,077 are of no value since neither the aliphatic or alicyclic nitriles are soluble in the present polymers.

Illustrative examples of the aromatic nitriles of the present invention are isophthalonitrile phthalonitrile, methyl phthalonitrile, methyl isophthalonitrile, terephthalonitrile, 1,4-bis(cyanomethyl) benzene, 1,4-dicyanonaphthalene, 1,8-dicyanonaphthalene and nitriles of substituted aromatic compounds which substituents do not inhibit the plasticizing effect of the material nor react to degrade the polymer. In particular, substituent groups which have active hydrogen atoms (e.g. carboxylic acids, phenols, amines, etc. should not be present). Examples of substituent groups which do not interfere with the plasticizing effect include alkoxy or aryloxy carbonyl groups, halogens such bromine, chlorine or fluorine, nitro- groups, aryloxy or alkoxy groups, and sulfur containing groups. Some specific groups which do not interfere in nitriles of the structure:

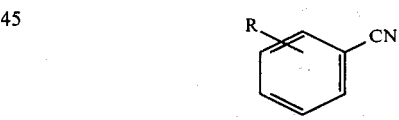

would be where R is phenyl, methoxy, ethoxy, phenoxy, methoxycarbonyl, ethoxycarbonyl, phenoxycarbonyl, nitro, methyl-sulfoxyl, phenylsulfonyl, benzoyl, acetyl, aminosulfonyl, N-alkylaminosulfonyl,N, N-dialkylaminosulfonyl, diarylphosphate, bromine, chloride or fluorine at the ortho, meta, or para positions relative to the nitrile group; of the structure:

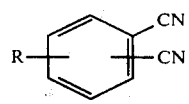

where the two CN groups are oriented ortho, meta or para to each other and the R group would be any of the groups described above or H at any one of the other four unsubstituted positions; of the structure:

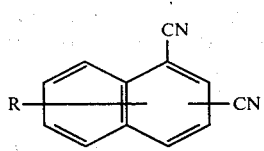

where the second nitrile group is at the 2, 3 or 4 position, and the R group would be any of the groups described above or H at any one of the remaining six unsubstituted positions; of the structure:

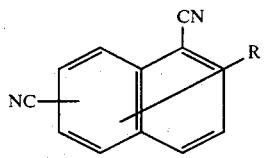

where the second CN group is at the 5, 6, 7 or 8 position and the R group would be any of the groups described above or H at any one of the remaining six unsubstituted positions.

Aromatic dinitriles are generally preferred, since most mononitriles are too volatile for use here and are only marginally effective. Moreover, the compatibility of the mononitriles with the polymer would be quite poor without a polar substitutent, such as described above. Substituted and unsubstituted aromatic moieties having 6 to 12 carbon atoms are also preferred, for the present nitriles. Isophthalonitrile and phthalonitrile are particularly preferred plasticizers.

The presence of a plasticizer in the polymers described herein will, as is the known effect of plasticizers, result in different film properties at elevated temperatures, compared to unplasticized polymer film, that is, polymer films not containing plasticizer. Generally, plasticizers are incorporated in the polymer in amounts of about 10 to 30 weight percent which will produce lower softening points than the polymer without the plasticizer incorporated therein.

The plasticized polymer is thus desirably softened at high temperatures so that films of these compositions may be sealed by heat. In the case of the present polymers which have high glass transition temperatures it may not always be desirable to give up the high temperature properties. For example, a cast film is just as easily produced without plasticizers, and may be more easily produced without plasticizers, if solvent removal is hampered by film sag or melting during solvent evaporation.

Films of the present unplasticized polymers are however difficult to heat seal because of their very high softening temperatures, because the polymer does not flow enough to coalesce into a single phase. Moreover, other materials employed in conjunction with the polymer may be damaged by the high temperatures required to seal the unplasticized polymer.

Accordingly it has been found that application of a plasticizer described herein as a thin coating to the surface of the unplasticized polymer, such as a film, results in the lowering of the softening point of the treated surface of the polymer to such a degree as to make the film heat sealable. For example, the treated surface may be applied to an untreated surface of the same or differed polymeric material and laminated thereto by heat and pressure. This method of heat sealing has a definite advantage over the use of lower melting adhesives, since the melting point of the adhesive may limit the maximum use temperature of the film. This method of heat sealing is also superior to that wherein the plasticizer is distributed throughout the film because less plasticizer per pound of polymer is required and the heat sealed product will retain its mechanical properties at higher temperatures.

Only one surface of a film to be heat sealed need have the plasticizer applied, that is the surface which is to be contacted with another surface must have the plasticizer thereon, however if a coated surface of the present polymer film were placed in contact with the uncoated surface of another film of the present polymer or with its own uncoated surface (as in cable wrapping) the softening point of the polymer in both film surfaces is reduced. The sealing is preferably accomplished by heat and pressure, such that the polymer on both surfaces contacts the plasticizer so that they both soften and coalesce into a single film. Thus, the two films would be joined by fusion. This same procedure has been used to join polymer film to other materials such as copper foil.

The thin coating of plasticizer may be applied from a solvent or a melt, to the entire surface to be sealed or to just an edge. The coating is preferably less than 0.5 mil, more preferably about 0.1 mil thick. Generally the thickness of such coating will be in the range of about 0.01 to 0.5 mil.

The solution method of applying the coating of plasticizer employs as a solvent any suitable volatile liquid which dissolves the present plasticizer and which does not affect the present polymers. For example, suitable solvents include low molecular weight alkanols having about 1 to 6 carbon atoms, low molecular weight ketones having about 3 to 6 carbon atoms, low molecular weight esters having about 2 to 6 carbon atoms, $C_5$ to $C_7$ alkane hydrocarbons, aromatic hydrocarbons having 6 to 12 carbon atoms, halogenated analogues of the above and the like. Such compounds as would be suitable are methanol, ethanol, propanol, 2-butanol, tertiary butanol, 2,3-dimethyl 2-butanol, 2 methyl 2-butanol, 3-pentanol, acetone, methyl ethyl ketone, methyl propyl ketone, butyl methyl ketone, 2-methyl-4-pentanone, methyl acetate, ethyl acetate, isobutyl acetate, isobutyl formate, isopropyl formate, ethyl propionate, isopropyl propionate, pentane, hexane, heptane, toluene, benzene, xylene, naptha, chloroform, carbon tetrachloride, butyl chloride, methylene dichloride, ethyl bromide.

Within the very wide range of useful solvents disclosed, those having a boiling point in the range of 30° to 125° C. are preferred.

The plasticizer is employed in the solvent based on total weight of solvent and plasticizer in an amount in the range of 1 to 90 weight percent and more preferably from 5 to 50 weight percent. The solvent-plasticizer composition is applied to a film by coating it on the desired portion of the film and evaporating the solvent and heating the film to a temperature of 100° to 200° C. (several seconds to 5 minutes). The resultant coated film is not tacky and has substantially the same properties as uncoated film, except for the added property of heat sealability.

To form a heat sealed bond between the present polymer film bearing the coating of plasticizer and itself or a similar film or some other object, the coated surface is applied against the surface to be joined thereto and heat and pressure applied to form the bond.

Generally temperatures in the range of 200° to 300° C. are employed for forming heat seals and more preferably temperatures in the range of 240° to 275° C. are used. Preferably, pressure is applied in conjunction with the heat to facilitate the coalescing of the films. Usually pressures in the range of 1 to 100 psig are used. Conveniently, the pressure is applied by nip rolls, platens or any other conventional means of applying pressure such as the tightness of the film layers against itself on a wrapped wire.

The amount of plasticizer applied by coating as described is generally about 1 to 10 weight percent of the film onto which it is coated, but may be as little as 0.1 weight percent thereof and obtain the described heat sealing or as much as 25 weight percent without detriment. The relative weight of plasticizer to the film is determined in regard to the entire film thickness in the area covered by the plasticizer.

The polymer-plasticizer compositions according to the present invention may be extruded without degradation. The extrusions may be carried out at temperatures in the range of 250° to 330° C. The extrudates of the invention compositions were tough, smooth clear and yellow to amber colored.

ILLUSTRATIVE PREFERRED EMBODIMENTS

For purposes of illustration, but not for exclusion, the majority of the examples illustrating the invention will be described in specific with respect to a particular polymer. That is, a polyparabanic acid prepared from diphenylmethane diisocyanate in accordance with proprietary techniques well described in patents assigned to Exxon Research and Engineering Company to result in a high performance polymer having the repeating unit shown below:

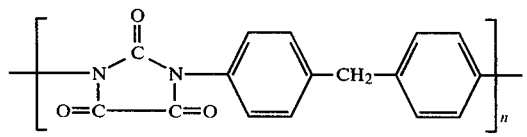

which is also designated as poly[1,4-phenylenemethylene-1,4-phenylene-1,3-(imidazolidine-2,4,5-trione)] which is also designated in chemical abstracts as poly[(2,4,5-trioxo-1,3-imidazolidinediyl)-1,4-phenylenemethylene-1,4-phenylene]. It has a high glass transition temperature of 290° C. and can not be extruded or molded. The precursor polyiminoimidazolidinedione having the following repeating unit was also used for illustrating this invention:

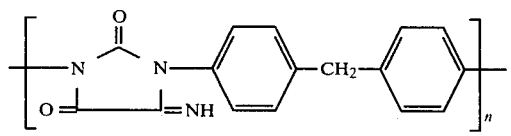

For purposes of convenience, these polymer species will be referred to as PPA-M and PIPA-M, respectively. It will be recognized that other polyparabanic acids (PPA) and their precursors (PIPA) can be prepared from other monomers so that the diphenyl methane group will be replaced by other organic moieties.

In general, the preferred polymers of the polymer-plasticizer compositions are those which have sufficient repeating units at room temperature to be solids.

In addition to the polymer and plasticizers, it is contemplated that other appropriate additives which are not detrimental to the compositions such as those employed to stabilize against oxidation or ultraviolet light, flame retardants, pigments, fillers and the like may be present.

The following examples illustrate the present invention and should not be construed as limiting the scope thereof:

EXAMPLES

The inherent viscosity ($\eta$inh) in these examples were determined in an Ubbelohde tube at 25° C. using a concentration of 0.5 g. of polymer in 100 ml. dimethylformamide.

The Brabender extruder which was used had a 0.75 inch barrel with an L/D ratio of 20:1. It was fitted with either a $\frac{1}{8}$ inch heated rod die or a heated 2" wide adjustable thickness ribbon die. The barrel had two heated zones. The screw had 10 flights feed, 5 flights compression, and 5 flights metering. The compression ratio was 3:1.

All polymer powders used in these examples were dry.

EXAMPLE 1

This example illustrates that isophthalonitrile will plasticize PIPA-M so that it can be melted.

A blend of 54 g. PIPA-M (inherent viscosity = 1) and 6 g. of isophthalonitrile was mixed in an electrically heated Brabender plasticorder mixer at 290° C. using a rotor speed of 40 rpm. The blend formed a homogeneous melt within 2 minutes. The PIPA-M did not melt when it was similarly heated in the absence of the isophthalonitrile.

EXAMPLE 2

This example shows that blends of isophthalonitrile in PPA-M melt.

Isophthalonitrile was blended into PPA-M powder (inherent viscosity = 1). Several concentrations (see below) of the nitrile in the polymer were prepared. They were then mixed in an electrically heated laboratory-size Brabender plasticorder mixing chamber at the temperatures and rotor speeds indicated below. All of the blends formed homogeneous melts whereas the unadulterated PPA-M did not melt nor soften even after being heated at 300° C. for as long as 30 minutes.

| Run | IPN[a] | °C.[b] | rpm[c] |
|---|---|---|---|
| | grams/100g. | | |
| 1 | 5 | 300 | 80 |
| 2 | 10 | 290 | 40 |
| 3 | 15 | 290 | 40 |
| 4 | 25 | 250 | 40 |

[a]grams of isophthalonitrile (IPN) per 100 g. of the PPA-M/IPN mixture.
[b]Temperature of the mixing changer.
[c]Revolutions per minute of the mixing rotors.

EXAMPLES 3 AND 4

This example illustrates that PPA-M is plasticized by phthalonitrile as well as isophthalonitrile.

Mixtures of PPA-M (inherent viscosity:1) with aromatic dinitriles of the compositions tabulated below were prepared and heated in the electrically heated mixing chamber of a laboratory-size Brabender plasticorder. Both of the blends formed homogenous melts within 5 minutes and the melts remained unchanged after mixing at 290° C. for 30 minutes. PPA-M powder which did not contain any additive did not melt nor soften under these same conditions even after 30 minutes.

| Example | Nitrile, g/100 g. of blend | °C. | rotor rpm |
|---------|---------------------------|-----|-----------|
| 3 | Phthalonitrile, 10 | 290 | 40 |
| 4 | Isophthalonitrile, 15 | 290 | 40 |

EXAMPLE 5

This example illustrates the plasticization of PPA-M of different inherent viscosities by isophthalonitrile.

Dry powders of two PPA-M resins which differed only in their inherent viscosities (0.5 and 1.0) were mixed with isophthalonitrile. Each blend contained 10 g. of isophthalonitrile per 100 g. in the blend. The powder blends were then heated (290° C.) and mixed (40 rpm) in the mixing chamber of a laboratory-size Brabender plasticorder. Both blends melted within 5 minutes; the melts appeared unchanged even after they had been mixed for 10 minutes at 290° C. Neither of the PPA-M powders used in these experiments melted of softened under the same conditions.

EXAMPLE 6

This example illustrates that a mixture of PPA-M and isophthalonitrile can be extruded.

A mixture of 850 g. of PPA-M ($\eta$inh=1) powder and 150 g. of isophthalonitrile was prepared. It was then extruded through a rod die. A clear smooth tough extrudate was obtained using a screw speed of 45 rpm and the following heating program: zone 1, 290° C.; zone 2, 290° C.; die, 265° C. The die pressure was 2000 psi.

PPA-M powder which did not contain any plasticizer did not melt nor soften under these same conditions.

EXAMPLE 7

This example illustrates the extrusion of a PPA-M mixture which was 15% isophthalonitrile at lower temperatures than the previous example. Note the need for extruding slower (slow screw speed) so a homogeneous melt could be formed. The compression molding of pellets formed from the extrudate is also described.

A mixture was prepared from 510 g. of PPA-M (inherent viscosity=1) and 90 g. of isophthalonitrile. It was extruded under the following conditions to a smooth tough rod: zone 1, 280° C.; zone 2, 270° C.; die, 270° C. and a screw of 20 rpm. The die pressure was 1000 psi.

The extrudate was chopped into pellets which were then compression molded at 290°-315° C. and a platen pressure of 15 tons. The molded pad was 0.0241 inch thick. It was cut into a 0.25 inch wide strips and their tensile properties at 25° C. determined. The tensile strength at break was 15,000 psi and the strips had an elongation of 9%.

EXAMPLE 8

This example illustrates the extrusion of a PPA-M/isophthalonitrile blend through a ribbon die and that the inherent viscosity of the polymer was not changed during extrusion. It also illustrates that a faster screw speed was needed than in previous examples because the temperatures were higher and, therefore, a shorter residence time was required.

A blend of 850 g. of PPA-M (inherent viscosity=1.03) powder and 150 g. of isophthalonitrile was prepared. The mixture was extruded through the 2 inch wide ribbon die using the following conditions: zone 1, 310° C.; zone 2, 320° C.; die, 320° C. and a screw speed of 100 rpm. The die pressure varied between 2000 to 3000 psi. The extrudate was glossy, clear, light yellow and smooth. It had an inherent viscosity of 1.04.

EXAMPLES 9 AND 10

This example illustrates that the presence of isophthalonitrile in PPA-M film does not have a deleterious effect on film properties at room temperature.

A film (0.0013 inches thick) was cast from a solution composed of 40 g. PPA-M (inherent viscosity:1), 71 g. isophthalonitrile, and 1600 g. of dimethylformamide. Its properties are compared with those of a similar film cast from a solution of only PPA-M in dimethylformamide. The plasticized film was slightly tougher and stronger than the unplasticized film.

| Example | 9 | 10 |
|---------|---|----|
| Film: | IPN/PPA-M | PPA-M |
| Tensile strength | | |
| at yield | 16,900 psi | 15,000 |
| at break | 20,800 psi | 16,000 |
| Elongation at break | 95% | 90% |
| Propagating tear strength | 6.0 g./mil | 5 g./mil |

EXAMPLE 11

This example illustrates the heat sealability of PPA-M film which contained isophthalonitrile.

Two films (0.0015 inch thick) which had been cast from dimethylformamide (DMF) solutions of PPA-M and isophthalonitrile were used for this study. The concentration of isophthalonitrile in one film was 4.9% and in the other it was 15.0%. For comparison a similar cast and dried film of PPA-M which contained no isophthalonitrile was used.

Strips of each film were cut ⅜ inch wide. Each strip was wrapped around an 8" long section of ¼ inch (outside diameter) copper tubing which had been cleaned to remove dirt and surface grease. The film wrappings were overlapped about 50%. The wrapped sections of the tubing were then put in a 260° C. oven for 5 minutes to heat seal the wrappings. After removing the wrapped tubes from the oven they were examined to determine if they had sealed and if they adhered to the copper. Both of the films which contained isophthalonitrile were sealed. The layers of film in the overlapped sections could not be separated and had become single films for all practical purposes. Neither of the heat sealed wrappings adhered to the copper tubing.

The wrapping made with pure PPA-M film did not heat seal; when the ends of the wrapping were released the film unwound without assistance.

EXAMPLE 12

This example illustrates the conversion of a PPA-M film which can not be heat sealed to one which can be heat sealed.

A 2 mil thick film of PPA-M was cut into 3/8 inch wide strips about 2 feet long. One strip was wrapped tightly around an 8" long section of ¼ inch (outside diameter) clean copper tubing. The film wrapping was overlapped about 50%.

Another of the strips was coated by wiping a solution of isophthalonitrile (20 parts) in acetone (80 parts) on one of the film surfaces. It was dried then wrapped tightly around a copper tubing just as the uncoated film strip had been. The coating was less than 0.0001 inch (0.1 mil) thick.

The two wrapped copper tubes were then put in a 250° C. over for 5 minutes. The wrapping which had been coated with isophthalonitrile was sealed to itself whereas the uncoated film was not sealed to itself.

The invention claimed is:

1. A stable meltable composition comprising heterocyclic polymers characterized in the repeating units by the tri-substituted 1,3-imidazolidine-1,3-diyl ring:

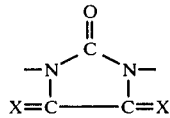

wherein X=O or NH, provided at least one X is O and a plasticizing amount of aromatic nitrile.

2. A stable meltable composition comprising heterocyclic polymers having the repeating unit:

wherein Q is

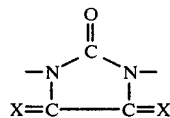

X=O or NH, provided at least one X is O, R is an organic moiety which may be aliphatic, alicyclic, aromatic or mixtures thereof and n is sufficiently large to produce a solid product and a plasticizing amount of aromatic nitrile.

3. The stable meltable composition according to claim 2 wherein said plasticizer is present in an amount of from 5 to 60 weight percent based on the total weight of polymer and plasticizer.

4. The stable meltable composition according to claim 3 wherein from 10 to 50 weight percent of plasticizer is present.

5. The stable meltable composition according to claim 2 wherein said aromatic moiety of the aromatic nitrile is aryl or alkaryl having 6 to 12 carbon atoms.

6. The stable meltable composition according to claim 5 wherein the plasticizer is phthalonitrile.

7. The stable meltable composition according to claim 5 wherein the plasticizer is isophthalonitrile.

8. The stable meltable composition according to claim 2 wherein the polymer has the structure:

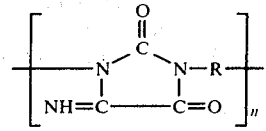

9. The stable meltable composition according to claim 2 wherein the polymer has the structure:

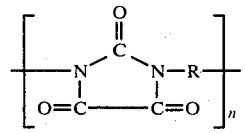

10. The stable meltable composition according to claims 8 or 9 wherein the R group is methylenediphenyl.

11. The stable meltable composition according to claims 8 or 9 wherein the R group is oxydiphenyl.

12. The stable meltable composition according to claims 8 or 9 wherein the R group is a mixture of methylenediphenyl and 2,4-tolylenediyl groups.

13. The stable meltable composition according to claims 8 or 9 wherein the R group is a mixture of methylenediphenyl and bitolylenediyl groups.

14. The stable meltable composition of either claims 1, 2, 6, 7, 8 or 9 wherein said plasticizer is incorporated into said polymer.

15. The stable meltable composition according to claim 14 wherein said polymer is a film.

16. The meltable composition of either claims 1, 2, 8 or 9 wherein said plasticizer is coated onto a surface of said polymer.

17. The stable meltable composition according to claim 16 wherein said polymer is a film.

18. The stable meltable composition according to claim 17 wherein said plasticizer is coated in a thickness of from about 0.01 to 0.5 mil.

19. The stable meltable composition according to claims 1, 2, 8 or 9 wherein said plasticizer is an aromatic dinitrile having 6 to 12 carbon atoms in the aromatic moiety.

20. The stable meltable composition according to claim 19 wherein said aromatic nitrile contains only nitrile group substituents.

21. The stable meltable composition according to claim 19 where the aromatic nitrile has an additional substituent which does not inhibit the plasticizing effect of said aromatic nitrile.

22. The stable meltable composition according to claims 1, 2, 8 or 9 wherein said plasticizer is an aromatic mononitrile having one polar substituent which does not inhibit the plasticizing effect of said aromatic mononitrile.

23. The stable meltable composition according to claims 1, 2, 8 or 9 containing from about 5 to 60 weight percent of plasticizer based on the total weight of polymer and plasticizer.

24. The stable meltable composition according to claim 23 containing 10 to 50 weight percent of plasticizer on said basis.

25. The stable meltable composition according to claim 14 wherein said polymer is a powder.

* * * * *